US012244987B2

(12) United States Patent
Monteleone

(10) Patent No.: US 12,244,987 B2
(45) Date of Patent: Mar. 4, 2025

(54) MICROPHONE ASSEMBLY

(71) Applicant: PEIKER acustic GmbH, Friedrichsdorf (DE)

(72) Inventor: Giovanni Monteleone, Créteil (FR)

(73) Assignee: PEIKER acustic GmbH, Friedrichsdorf (DE)

( * ) Notice: Subject to any disclaimer, the term of this patent is extended or adjusted under 35 U.S.C. 154(b) by 43 days.

(21) Appl. No.: 17/623,526

(22) PCT Filed: Jun. 23, 2020

(86) PCT No.: PCT/EP2020/067445
§ 371 (c)(1),
(2) Date: Dec. 28, 2021

(87) PCT Pub. No.: WO2020/260247
PCT Pub. Date: Dec. 30, 2020

(65) Prior Publication Data
US 2022/0360877 A1 Nov. 10, 2022

(30) Foreign Application Priority Data
Jun. 28, 2019 (DE) ..................... 10 2019 117 523.2

(51) Int. Cl.
*H04R 9/08* (2006.01)
*H04R 1/02* (2006.01)
(Continued)

(52) U.S. Cl.
CPC ............... *H04R 1/086* (2013.01); *H04R 1/04* (2013.01); *H04R 3/00* (2013.01); *H04R 2499/13* (2013.01)

(58) Field of Classification Search
CPC ......... H04R 9/08; H04R 1/02; H04R 2499/13
(Continued)

(56) References Cited

U.S. PATENT DOCUMENTS

2014/0246226 A1* 9/2014 Jin ......................... H05K 3/182
174/257
2018/0124487 A1 5/2018 Tagaya
2019/0366941 A1* 12/2019 Fischer ................ H04R 1/2853

FOREIGN PATENT DOCUMENTS

EP 2635043 A2 9/2013
JP H07107579 A 4/1995
(Continued)

OTHER PUBLICATIONS

International Search Report and Written Opinion issued in corresponding International Patent Application No. PCT/EP2020/067445, mailed on Sep. 23, 2020 (12 pages).

*Primary Examiner* — George C Monikang
(74) *Attorney, Agent, or Firm* — Osha Bergman Watanabe & Burton LLP

(57) ABSTRACT

A microphone assembly for exterior use on vehicles having a housing base including at least one compartment, a PCBA (printed circuit board assembly) with at least one acoustic membrane, a sealing cover to at least partially overlap with the compartment is disclosed. The sealing cover has at least one opening with said opening at least partially aligned with said acoustic membrane. The assembly has a housing cover including a first grid at least partially aligned with said opening in the sealing cover, and a shielding cover. The shielding cover has a second grid at least partially aligned with said opening in the sealing cover. The first grid and the second grid are aligned in offset in order to provide a labyrinth path without straight passthrough passages from the exterior of the microphone assembly to the acoustic membrane.

9 Claims, 3 Drawing Sheets

(51) Int. Cl.
*H04R 1/04* (2006.01)
*H04R 1/08* (2006.01)
*H04R 3/00* (2006.01)

(58) Field of Classification Search
USPC ........................................ 381/355, 361, 365
See application file for complete search history.

(56) References Cited

FOREIGN PATENT DOCUMENTS

| | | | |
|---|---|---|---|
| JP | H109327082 | A | 12/1997 |
| JP | 2016092671 | A | 5/2016 |
| WO | 2015/015646 | A1 | 2/2015 |

* cited by examiner

MICROPHONE ASSEMBLY

The invention relates to a microphone assembly, mainly applied in automotive use cases.

Common interior microphone assemblies cannot be used in the exterior of a vehicle since environmental impacts lead to malfunction or destruction of the microphone assembly.

Especially the influence of moisture and water usually leads to defects.

Objective of the invention is to provide a microphone assembly which can be used in the exterior of a vehicle and in a mostly preferred embodiment is compliant with high IP protection e.g. IP6k9k.

This objective is achieved by a Microphone assembly, especially for exterior use on vehicles, comprising

- a housing base including at least one compartment,
- a PCBA (printed circuit board assembly) with at least one acoustic membrane,
- a sealing cover to at least partially overlap with the compartment,
- wherein the sealing cover comprises at least one opening with said opening at least partially aligned with said acoustic membrane,
- further comprising a housing cover,
- wherein said housing cover comprises a first grid at least partially aligned with said opening in the sealing cover,
- and a shielding cover,
- wherein said shielding cover comprises a second grid at least partially aligned with said opening in the sealing cover,
- wherein the first grid and the second grid are aligned in offset in order to provide a labyrinth path without straight passthrough passages from the exterior of the microphone assembly to the acoustic membrane.

By providing a water sealing around an acoustic membrane and sealing the PCBA against the environment using a sealing cover as well as avoiding direct impact of water on the acoustic membrane via grids aligned in offset, the microphone assembly is capable to withstand standing water and no pressure impact of water, e.g. through rain or momentum when driving through rain or spray can directly reach the acoustic membrane through the grids.

The features of the preceding claims shall be described further by a preferred embodiment. The invention is anyway not restricted to the shown embodiment.

The Embodiment Shows in

Figure 1:
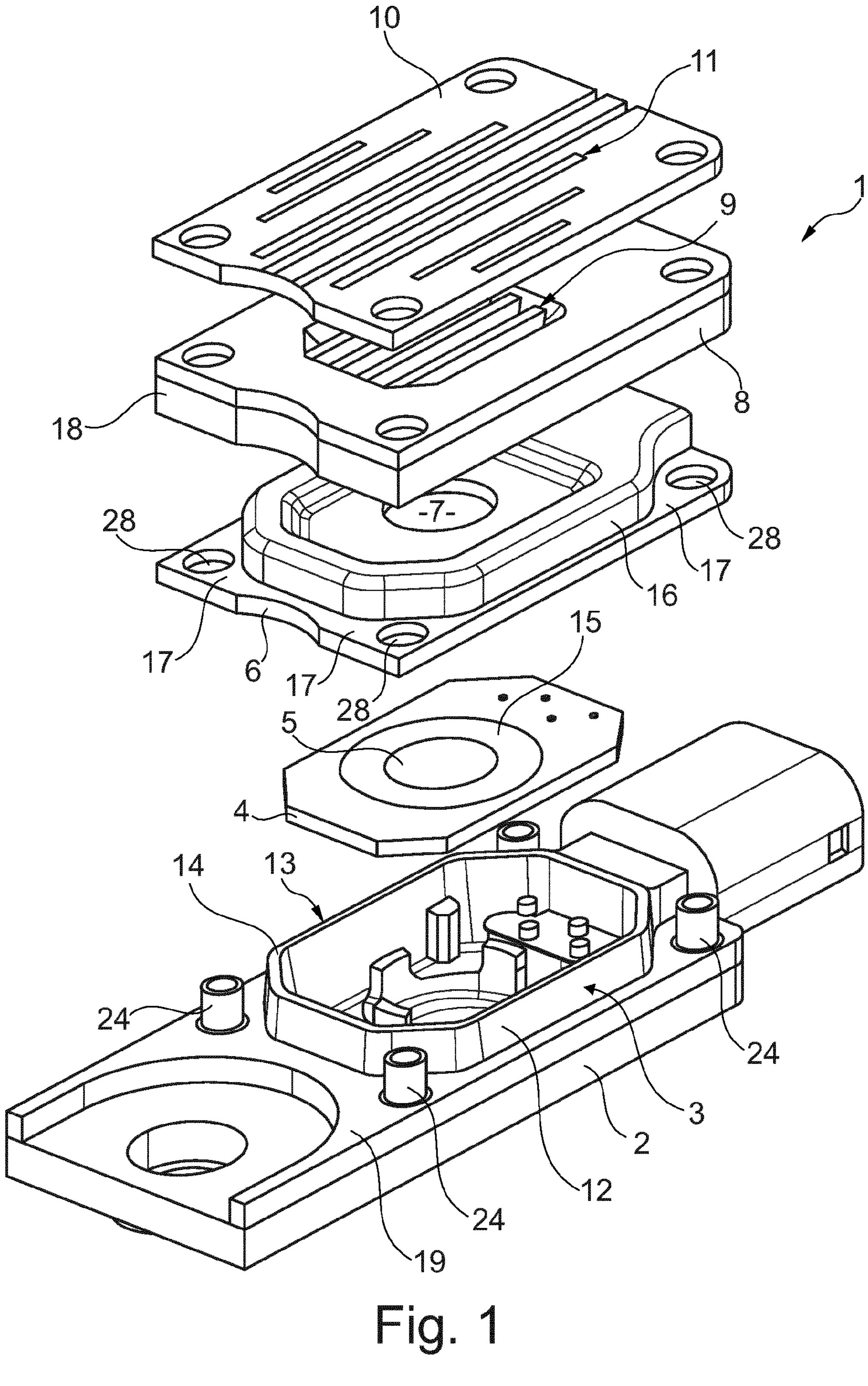
Figure 2B:
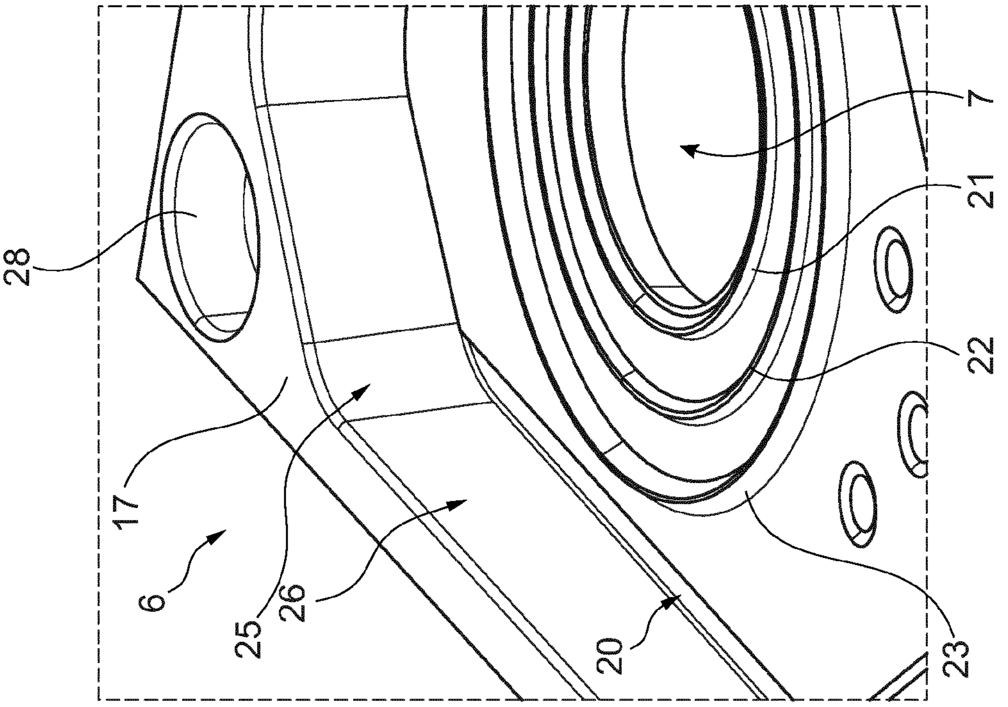
Figure 2A:
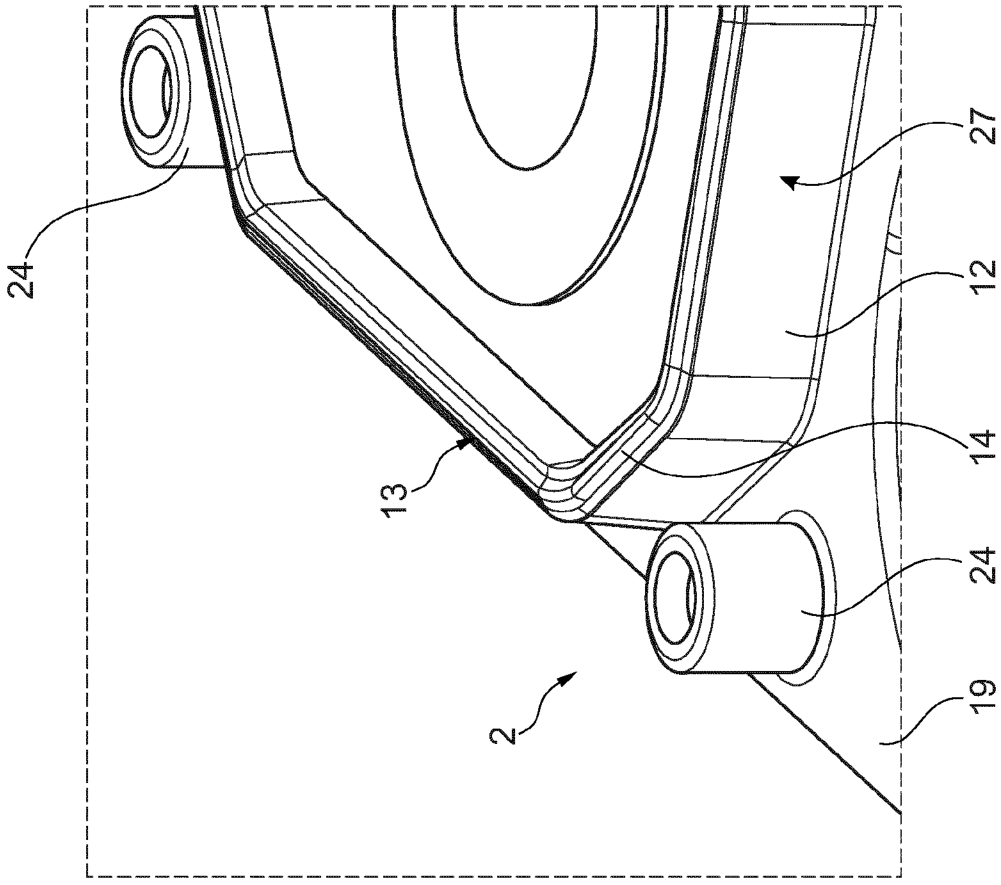
Figure 3:
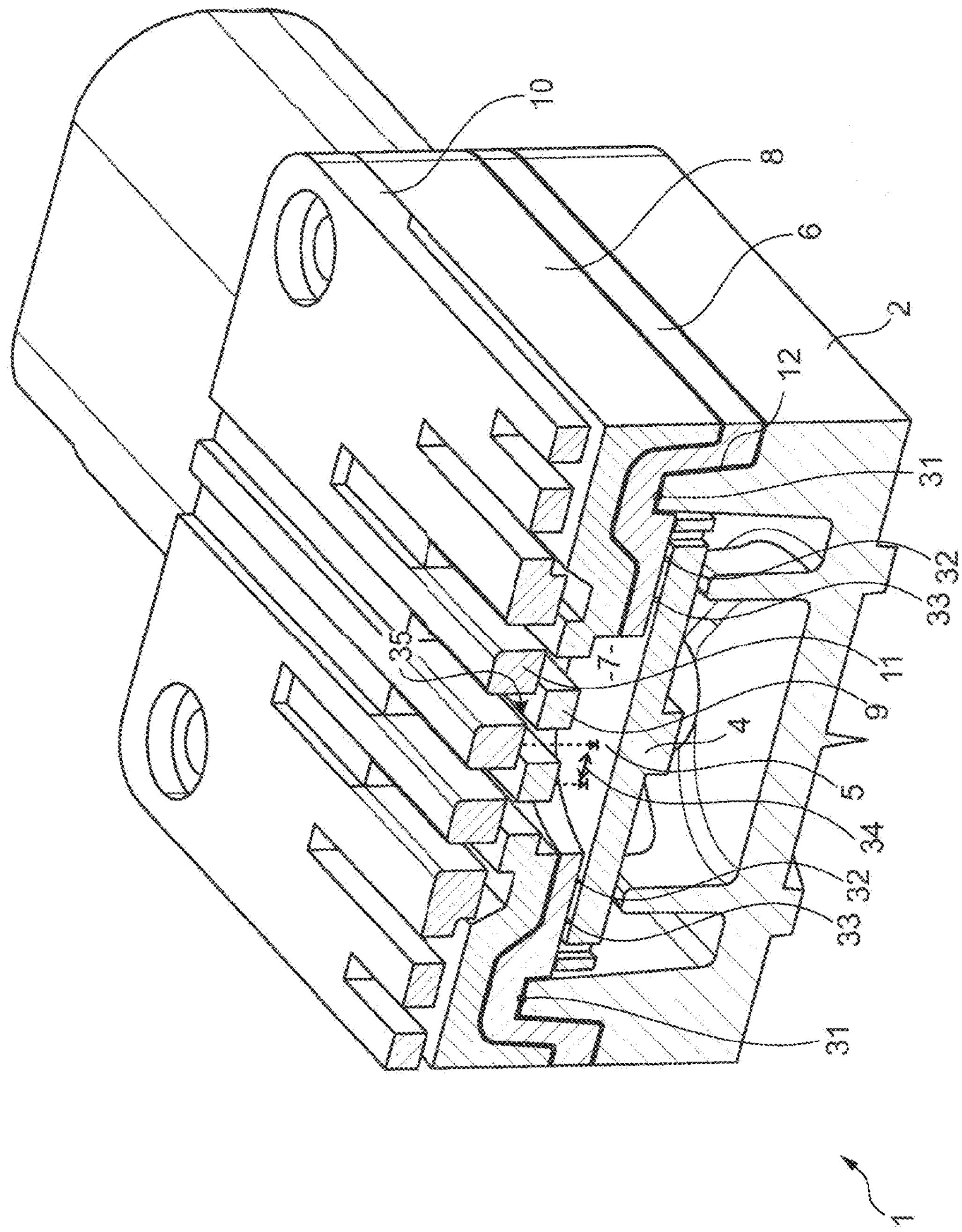

FIG. 1 an exploded view of the main parts of the microhone assembly;

FIG. 2*a/b* a detail of the housing base (a) and the sealing cover (b);

FIG. 3 a cross section through a microphone assembly showing the interactions of the parts.

FIG. 1 shows an exploded view of a microphone assembly 1 according to the present invention. The microphone assembly 1 comprises:

- a housing base 2 including at least one compartment 3,
- a PCBA 4 (printed circuit board assembly) with at least one acoustic membrane 5,
- a sealing cover 6 to at least partially overlap with the compartment 3,
- wherein the sealing cover 6 comprises at least one opening 7 with said opening at least partially aligned with said acoustic membrane 5,
- further comprising a housing cover 8,
- wherein said housing cover 8 comprises a first grid 9 at least partially aligned with said opening 7 in the sealing cover 6,

- and a shielding cover 10,
- wherein said shielding cover 10 comprises a second grid 11 at least partially aligned with said opening 7 in the sealing cover 6.

The compartment 3 of the housing base 2 is formed by a compartment wall 12 surrounding a defined area for enclosing and supporting the PCBA 4. The upper surface 13 of the compartment wall 12 carries a sealing rib 14. The sealing rib 14 is provided to interact with groove means 20 on the sealing cover 6, described in Detail in FIG. 2*b*.

The PCBA 4 comprises an acoustic membrane 5 configured as a water resistant acoustic membrane 5. The outer perimeter 15 of the acoustic membrane 5 is used to interact with sealing rings 21, 22 and 23 described in Detail in FIG. 2*b*.

The sealing cover 6 itself is configured to at least partially receive the compartment wall 12 and establish surrounding contact between the inside flank 26 of a sealing cover wall element 16 and the outer flank 27 of compartment wall 12.

The sealing cover 6 also forms a rim area 17 which is separating a wall portion 18 of the housing cover 8 from a socket portion 19 of the housing base 2. By making the sealing cover 6 from flexible material like e.g. silicone rubber, the compression between the wall portion 18 and the socket portion 19 provides a seal and protects the inside area of the compartment 3 and by this the PCBA 4 from external influences like e.g. water. The stacked setup will be described in Detail in FIG. 3.

FIGS. 2*a* and 2*b* show the interacting seal elements in an enlarged cutout view. FIG. 2*a* shows a section of the housing base 2 with compartment wall 12 and screwing sockets 24.

FIG. 2*b* shows a upsidedown view of the sealing cover 6. The interior area 25 of the sealing cover 6 will receive the compartment 3 of the PCBA 4. The inner flank 26 of the wall element 16 aligns with groove means 20. These groove means 20 interact with the sealing rib 14 on the compartment wall 12 and form a tight sealing. Additionally as described above, the flanks 26, 27 of the wall elements also provide sealing function as well as the rim area 17.

FIG. 2*b* also shows the sealing rings 21, 22 and 23 which are coaxially arranged around the opening 7 in the sealing cover 6. The sealing rings 21, 22 and 23 are radially extended from the center of the opening 7 in order to form several seals when interacting with the outer perimeter 15 as a sealing area on the acoustic membrane 5 on the PCBA 4. By this sealing, external influences like water on the acoustic membrane 5 cannot reach the inner volume of the compartment 3 and harm the electronics of the PCBA 4.

The sealing cover 6 also comprises holes 28 which assist in aligning the rim are 17 by receiving the screwing sockets 24.

FIG. 3 shows a cross section through the readily assembled microphone assembly 1. The wall element 12 of the compartment 3 interacts with the sealing cover 6 to form a labyrinth like sealing, symbolized by sealing points 31 in the position of the groove means 20 and the sealing rib 14. The sealing rings 21, 22 and 23 form the sealing symbolized by sealing points 32 and 33 against e.g. water coming from the central opening 7.

To avoid significant impact momentum of e.g. spray water, the first grid 9 and the second grid 11 are arranged with a coplanar offset 34. For reasons of clarity only one stanchion per grid is referenced. Due to a spacing 35 in height between first grid 9 and second grid 11 acoustic waves can pass to the acoustic membrane 5 by meandering through the grids. Splashing water e.g. from rain or spray is not able to meander through the passage and any momentum of impact of e.g. water will be compensated by the grids 9 and 11 before hitting the acoustic membrane 5. Due to this effect, sealing 31, 32 and 33 is sufficient to protect the PCBA 4 from environmental influences and allows the microphone assembly 1 to be used in the exterior of e.g. a car or vehicles the like.

The invention claimed is:

1. A microphone assembly for exterior use on vehicles, comprising:

a housing base including at least one compartment;

a printed circuit board assembly PCBS with at least one acoustic membrane;

a sealing cover to at least partially overlap with the compartment;

wherein the sealing cover comprises at least one opening with said opening at least partially aligned with said acoustic membrane;

a housing cover;

wherein said housing cover comprises:

a first grid at least partially aligned with said opening in the sealing cover, and a shielding cover, wherein said shielding cover comprises a second grid at least partially aligned with said opening in the sealing cover, wherein the first grid and the second grid are aligned in parallel in offset in order to provide a labyrinth path without straight passthrough passages from the exterior of the microphone assembly to the acoustic membrane, and wherein the sealing cover comprises a rim area separating a wall portion of the housing cover from a socket portion of the housing base.

2. The microphone assembly according to claim 1, wherein the sealing cover comprises three sealing rings, being arranged on the PCBA facing side of the sealing cover and being coaxially aligned with the opening and radially extended from the center of the opening.

3. The microphone assembly according to claim 1, wherein the acoustic membrane is forming a water resistant at least partial cover for the PCBA.

4. The microphone assembly according to claim 1, wherein the sealing cover provides groove means to interact with corresponding sealing ribs on a wall segment of the compartment whereas the sealing ribs provide circumferential contact between the wall segment of the compartment and the groove means of the sealing cover.

5. The microphone assembly according to claim 1, wherein the sealing cover is made of silicone rubber.

6. The microphone assembly according to claim 1, wherein the first grid is placed in a same direction to the second grid.

7. The microphone assembly according to claim 1, wherein the housing cover comprises first grids, and each of the first grids is placed in parallel with each other, and the shielding cover comprises second grids, and each of the second grids is placed in parallel with each other.

8. A microphone assembly for exterior use on vehicles, comprising:

a housing base including at least one compartment;

a printed circuit board assembly PCBS with at least one acoustic membrane;

a sealing cover to at least partially overlap with the compartment;

wherein the sealing cover comprises at least one opening with said opening at least partially aligned with said acoustic membrane;

a housing cover;

wherein said housing cover comprises:

a first grid at least partially aligned with said opening in the sealing cover, and a shielding cover, wherein said shielding cover comprises a second grid at least partially aligned with said opening in the sealing cover, wherein the first grid and the second grid are aligned in parallel in offset in order to provide a labyrinth path without straight passthrough passages from the exterior of the microphone assembly to the acoustic membrane, and wherein the sealing cover comprises three sealing rings, being arranged on the PCBA facing side of the sealing cover and being coaxially aligned with the opening and radially extended from the center of the opening.

9. A microphone assembly for exterior use on vehicles, comprising:

a housing base including at least one compartment;

a printed circuit board assembly PCBS with at least one acoustic membrane;

a sealing cover to at least partially overlap with the compartment;

wherein the sealing cover comprises at least one opening with said opening at least partially aligned with said acoustic membrane;

a housing cover;

wherein said housing cover comprises:

a first grid at least partially aligned with said opening in the sealing cover, and a shielding cover, wherein said shielding cover comprises a second grid at least partially aligned with said opening in the sealing cover, wherein the first grid and the second grid are aligned in parallel in offset in order to provide a labyrinth path without straight passthrough passages from the exterior of the microphone assembly to the acoustic membrane, and wherein the sealing cover provides groove means to interact with corresponding sealing ribs on a wall segment of the compartment whereas the sealing ribs provide circumferential contact between the wall segment of the compartment and the groove means of the sealing cover.

* * * * *